(12) United States Patent  
Wang et al.

(10) Patent No.: US 11,681,174 B2  
(45) Date of Patent: Jun. 20, 2023

(54) DISPLAY DEVICE AND METHOD FOR MANUFACTURING THE SAME

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Kaiwen Wang, Beijing (CN); Haifeng Xu, Beijing (CN); Hui Dong, Beijing (CN); Qiang Zhang, Beijing (CN); Aixia Sang, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 172 days.

(21) Appl. No.: 17/284,580

(22) PCT Filed: Jul. 23, 2020

(86) PCT No.: PCT/CN2020/103683  
§ 371 (c)(1),  
(2) Date: Apr. 12, 2021

(87) PCT Pub. No.: WO2021/017993  
PCT Pub. Date: Feb. 4, 2021

(65) Prior Publication Data  
US 2021/0318572 A1 Oct. 14, 2021

(30) Foreign Application Priority Data  
Jul. 31, 2019 (CN) .......................... 201910706643.0

(51) Int. Cl.  
*G02F 1/1333* (2006.01)  
*G02F 1/1335* (2006.01)

(52) U.S. Cl.  
CPC ...... *G02F 1/133331* (2021.01); *G02F 1/1333* (2013.01); *G02F 1/133308* (2013.01);  
(Continued)

(58) Field of Classification Search  
CPC ......... G02F 1/133331; G02F 1/133325; G02F 1/133512; G02F 1/33528; G02F 2202/28;  
(Continued)

(56) References Cited

U.S. PATENT DOCUMENTS

2016/0183399 A1* 6/2016 Lee .................. G02F 1/133308  
361/752  
2018/0107312 A1* 4/2018 Wang ................... G06F 3/0412  
2020/0396853 A1 12/2020 Fang et al.

FOREIGN PATENT DOCUMENTS

CN 104991302 A * 10/2015  
CN 105677113 A 6/2016  
(Continued)

*Primary Examiner* — Shan Liu  
(74) *Attorney, Agent, or Firm* — Westman, Champlin & Koehler, P.A.

(57) ABSTRACT

A display device is provided, and the display device includes: a display module, including a first outer surface, a second outer surface and a side surface; a tape, including a first part and a second part, wherein the first part is bonded to an edge of the first outer surface of the display module, and the second part is bonded to the side surface of the display module; a cover component, wherein the cover component and the display module are arranged oppositely and spaced apart; and a tape holder between the cover component and the display module, wherein the tape holder includes a main body portion and at least one through hole (Continued)

formed in the main body portion. A method for manufacturing the display device is further provided.

19 Claims, 12 Drawing Sheets

(52) U.S. Cl.
CPC .. *G02F 1/133325* (2021.01); *G02F 1/133512* (2013.01); *G02F 1/133528* (2013.01); *G02F 2202/28* (2013.01)

(58) Field of Classification Search
CPC ........... G02F 1/133308; G02F 1/13338; G02F 1/1333; G02F 1/133328; G02F 1/133608; G02F 1/133311; G02F 1/133314; G02F 1/133317; G02F 1/133332; G02F 1/133322; G02F 1/133334; G02F 2001/133311; G02F 2001/133314; G02F 2001/133317; G02F 2001/13332; G02F 2001/133322; G02F 2001/133325; G02F 2001/133331; G02F 2001/1333; G02F 1/136209; H01J 11/44; H01J 2211/444; H01J 2329/323; H01J 29/327
See application file for complete search history.

(56) References Cited

FOREIGN PATENT DOCUMENTS

| | | | |
|---|---|---|---|
| CN | 106814500 A | * | 6/2017 |
| CN | 106814500 A | | 6/2017 |
| CN | 107102775 A | | 8/2017 |
| CN | 207601453 U | | 7/2018 |
| CN | 210005817 U | | 1/2020 |
| JP | 2012088389 A | * | 5/2012 |
| KR | 1020100011849 A | | 2/2010 |

* cited by examiner

DISPLAY DEVICE AND METHOD FOR MANUFACTURING THE SAME

CROSS-REFERENCE TO RELATED APPLICATION(S)

The present disclosure is a Section 371 National Stage Application of International Application No. PCT/CN2020/103683, filed on Jul. 23, 2020, entitled "DISPLAY DEVICE AND METHOD FOR MANUFACTURING THE SAME", and the PCT Application claims priority to Chinese Patent Application No. 201910706643.0, filed on Jul. 31, 2019, the disclosure of which is incorporated herein by reference in their entirety.

TECHNICAL FIELD

The present disclosure relates to a field of display technology, an in particular to a display device and a method for manufacturing the display device.

BACKGROUND

In recent years, liquid crystal display devices are widely used. Currently, a liquid crystal display device generally includes a backlight module and a display panel. The display panel of the liquid crystal display device does not emit light itself, and the display panel realizes a function of image display with light provided by the backlight module. Thus, it is necessary to bond the backlight module, the display panel and a cover component such as a cover plate, so as to form the display device.

SUMMARY

An aspect of the present disclosure provides a display device, including: a display module, including a first outer surface, a second outer surface and a side surface, wherein the first outer surface and the second outer surface are arranged opposite to each other, the side surface connects the first outer surface and the second outer surface, and the first outer surface is located on a light-emitting side of the display module; a tape, including a first part and a second part, wherein the first part is bonded to an edge of the first outer surface of the display module, and the second part is bonded to the side surface of the display module; a cover component, wherein the cover component and the display module are arranged oppositely and spaced apart; and a tape holder between the cover component and the display module, including a main body portion and at least one through hole, wherein at least a part of the main body portion is pressed on an end portion of the first part of the tape, and divides a space between the cover component and the display module into a first space and a second space, and the at least one through hole is formed in the main body portion and communicates the first space with the second space.

In some embodiments, the main body portion includes two or more through holes, and each through hole communicates the first space with the second space.

In some embodiments, a thickness of the main body portion is smaller than or equal to a distance between the display module and the cover component.

In some embodiments, the display module includes a polarizer, the polarizer is arranged close to the first outer surface, and the end portion of the first part of the tape abuts the polarizer.

In some embodiments, a side surface of the first part of the tape facing the polarizer is closer to the side surface of the display module than a side surface of the main body portion facing the second space.

In some embodiments, a part of the main body portion is further pressed on the polarizer.

In some embodiments, a side surface of the main body portion facing the second space is flush with the side surface of the first part of the tape facing the polarizer.

In some embodiments, a surface of the first part of the tape facing the cover component is substantially flush with a surface of the polarizer facing the cover component.

In some embodiments, the tape holder is annularly arranged between the cover component and the display module.

In some embodiments, the main body portion and the tape both include a light shielding material.

In some embodiments, the main body portion includes a black rubber material.

In some embodiments, the display device further includes a first optical adhesive portion and a second optical adhesive portion, and the first space is closer to the side surface of the display module than the second space, the first optical adhesive portion is located in the first space to press on at least a part of the first part of the tape, and the second optical adhesive portion completely fills the second space.

In some embodiments, the first optical adhesive portion and the second optical adhesive portion both include a water adhesive.

In some embodiments, the tape further includes a third part that is bonded to an edge of the second outer surface of the display module.

In some embodiments, the display device further includes an encapsulation adhesive, wherein the encapsulation adhesive is annularly arranged between the cover component and the display module, and the encapsulation adhesive is closer to the side surface of the display module than the tape holder.

In some embodiments, the display module includes a backlight module, a display panel, a back frame and a middle frame, and the backlight module is located in an accommodation space of the back frame, the display panel is carried on the middle frame; and wherein the second outer surface is on a side of the back frame away from the backlight module, the first outer surface is on a side of the middle frame and the display panel away from the backlight module, and the side surface is on a side of the middle frame away from the backlight module.

In some embodiments, the cover component includes a transparent cover plate.

In some embodiments, the cover component includes a transparent cover plate and a touch substrate, and the touch substrate is bonded to a surface of the transparent cover plate facing the display module.

Another aspect of the present disclosure provides a method for manufacturing a display device, including: forming a display module by assembling, wherein the display module includes a first outer surface, a second outer surface and a side surface, the first outer surface and the second outer surface are arranged opposite to each other, the side surface connects the first outer surface and the second outer surface, and the first outer surface is located on a light-emitting side of the display module; bonding a tape at least on an edge of the first outer surface of the display module and the side surface of the display module; pressing a tape holder at least on an end portion of a tape bonded to the edge of the first outer surface of the display module, wherein the tape holder includes a main body portion and at least one through hole formed in the main body portion; and bonding a cover component, wherein the main body portion is arranged between the cover component and the display module, a space between the cover component and the display module is divided into a first space and a second space, and the at least one through hole communicates the first space with the second space.

BRIEF DESCRIPTION OF THE DRAWINGS

With the description below to the present disclosure with reference to the accompanying drawings, other purposes and advantages of the present disclosure will become apparent, which may facilitate to a comprehensive understanding of the present disclosure, wherein.

Figure 1A:
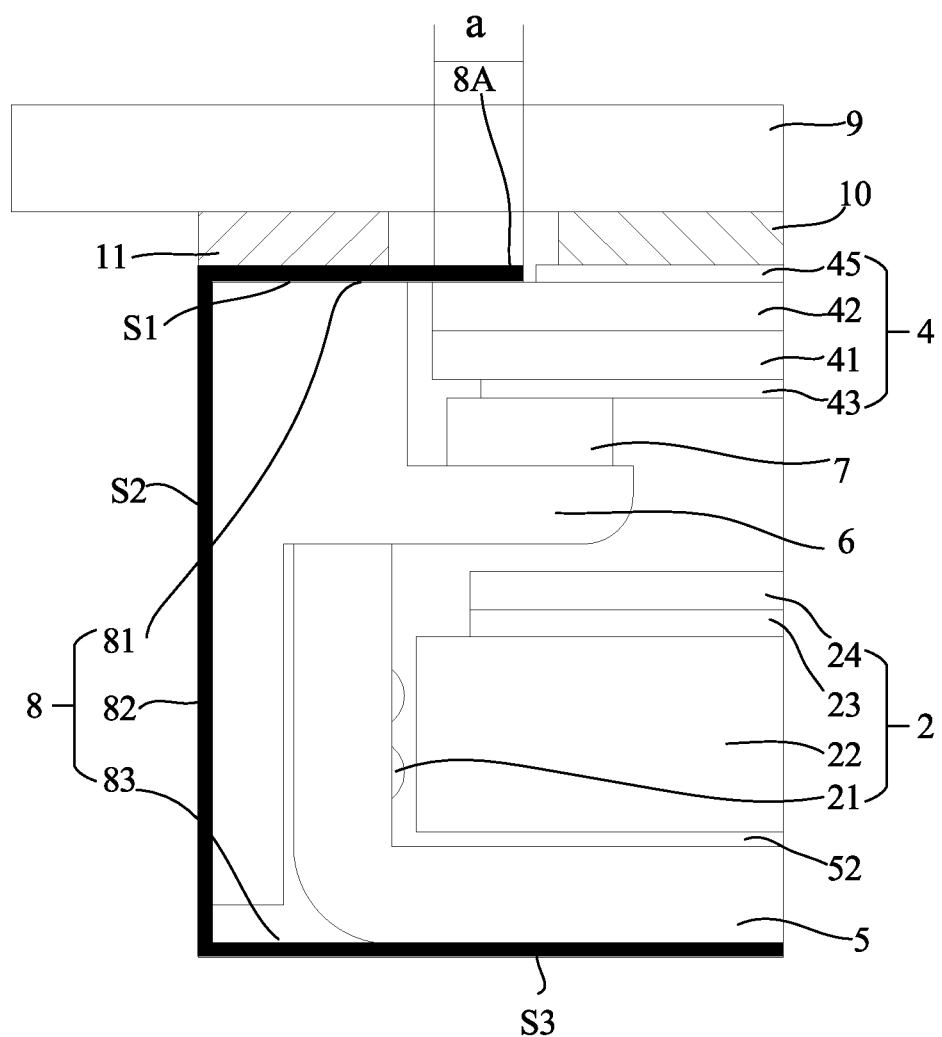
FIG. 1A is a partial structural schematic diagram of a display device according to the embodiments of the present disclosure.

It should be noted that, for clarity, in the accompanying drawings for describing the present disclosure, dimensions of layers, structures or areas may be enlarged or reduced, that is, the accompanying drawings are not drawn to actual scales.

DETAILED DESCRIPTION OF EMBODIMENTS

To make purposes, technical solutions and advantages of the embodiments of the present disclosure more apparent, the technical solution of the embodiments of the present disclosure will be clearly and completely described in conjunction with the accompanying drawings of the present disclosure. Obviously, the embodiments described are part of the embodiments of the present disclosure, rather than all of the embodiments. Based on the described embodiments of the present disclosure, all other embodiments obtained by those skilled in the art without any creative work all fall with the protection scope of the present disclosure.

Unless otherwise defined, the technical terms or scientific terms used in the present disclosure should have general meanings understood by those skilled in the art. "First", "second" and similar words used in the present disclosure do not represent any order, quantity or importance, and they are used to distinguish different components. "Comprise" or "include" and similar expressions mean that an element or item before the expression covers elements, items and their equivalents listed after the expression, and other elements or items are not excluded.

In the present disclosure, unless otherwise specified, directional terms such as "up", "down", "left", "right", "inside", "outside", etc. are used to represent directional or positional relationships shown in the accompanying drawings, they are used for ease of description of the present disclosure, rather than indicate or imply the related device, element or component must have a certain orientation, and is configured or operated in the certain orientation. It should be understood that, after an absolute position of the described object is changed, the relative positional relationships thereof may alternate correspondingly. Thus, these directional terms should not be understood as a limitation to the present disclosure.

The expression "OCR" and "OCA" (also referred to as water adhesive or optical liquid adhesive) should be understood in accordance with the general meaning in the art, for example, in the art, both the "OCR" and "OCA" are used as an optical adhesive. In general, the OCA is solid or semi-solid before being cured, it has a poor fluidity and is turned into solid after being cured; and the OCR is liquid before being cured, it has a good fluidity and is turned into solid after being cured.

The expression "annularly arranged" in the present disclosure refers to a closed shape is provided in a peripheral area of the display panel. For example, a circle of strip is provided in the peripheral area of the display panel, and in the present disclosure, it may be expressed as the strip is annularly arranged on the display panel.

FIG. 1A is a partial structural schematic diagram of a display device according to the embodiments of the present disclosure. For example, the display device shown in FIG. 1A may be a liquid crystal display device. Referring to FIG. 1A, the display device 1 may include a backlight module 2, a display panel 4 such as a liquid crystal display panel, a back frame 5 and a middle frame 6.

For example, the backlight module 2 may include a light source 21 and an optical film set. For example, the optical film set may include a diffusion sheet 23, a brightness enhancement sheet 24 and other optical film sheets. It should be understood that, the optical film set may further include other types of optical film sheets and the types of the optical film sheets included in the optical film set may be selected according to actual needs. For example, the light source 21 may include a plurality of light-emitting diodes (LED). Further, for example, the backlight module 2 may be a side backlight module, and the backlight module 2 may further include a light guide plate 22. As shown in FIG. 1A, the light source 21 may be arranged on one side of the light guide plate 22, the side of the light guide plate 22 is called a light incident surface of the light guide plate 22. Light emitted from the light source 21 is scattered by the light guide plate 22 and then emitted from a light-emitting surface of the light guide plate 22, and then forms a planar light source after passing through the optical film set.

Referring to FIG. 1A, the display panel 4 such as a liquid crystal display panel may include two substrates arranged opposite to each other. For example, the two substrates may be an array substrate 41 and a color filter substrate 42. It should be understood that, the display panel 4 may further include a liquid crystal layer between the array substrate 41 and the color filter substrate 42. Base substrates of the array substrate 41 and the color filter substrate 42 may be glass. In addition, it should be noted that, the array substrate 41 and the color filter substrate 42 may adopt the common structures in the art, which will not be repeated herein.

The display panel 4 may further include a lower polarizer 43 and an upper polarizer 45. In the embodiment shown in FIG. 1A, the lower polarizer 43 is arranged on a lower surface of the array substrate 41, and the upper polarizer 45 is arranged on an upper surface of the color filter substrate 42.

Referring to FIG. 1A, the back frame 5 is provided with an accommodation space 52 for accommodating the backlight module 2. The middle frame 6 is used to carry the display panel 4. For example, a buffer element 7, such as buffer foam, is arranged between a bearing surface of the middle frame 6 and the lower polarizer 43 of the display panel 4. A part of the middle frame 6 may be supported on the back frame 5. The back frame 5 may be provided with a side spacer, and a sidewall of the middle frame 6 is connected with the side spacer of the back frame 5 through a snap connection, a thread connection and the like.

Figure 1B:
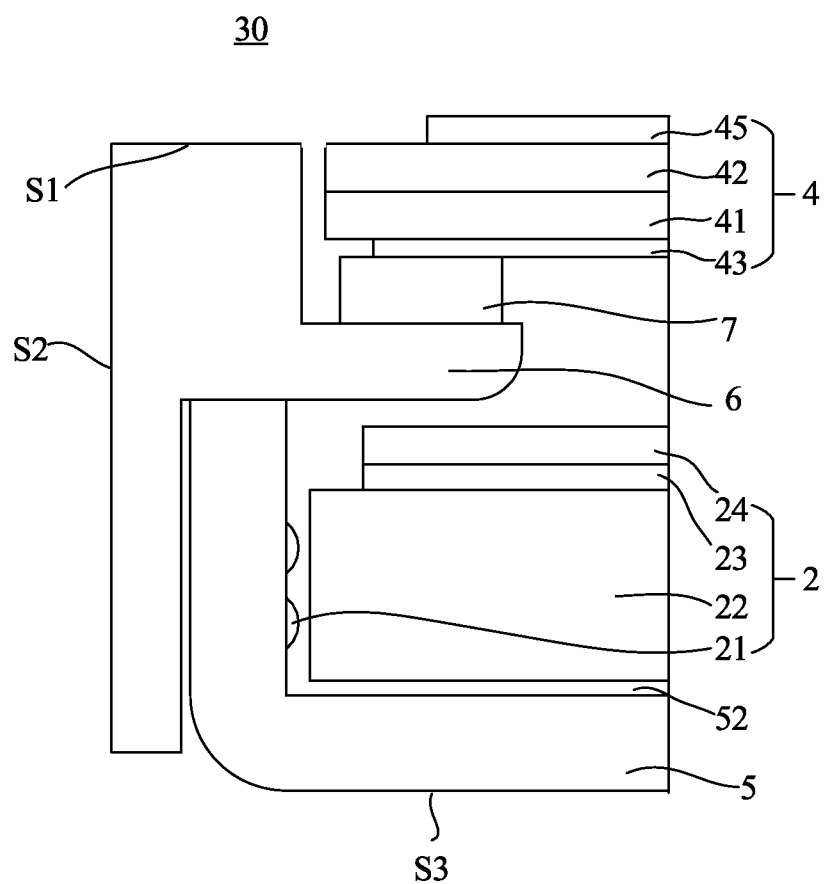
FIG. 1B is a partial structural schematic diagram of a display module according to the embodiments of the present disclosure.

FIG. 1B is a partial structural schematic diagram of a display module according to the embodiments of the present disclosure. In the present disclosure, for ease of description, a component formed by assembling the backlight module 2 and the display panel 4 is called a display module 30, that is, the expression "the display module 30" includes the backlight module 2, the display panel 4 and a frame bonding the backlight module 2 and the display panel 4. For example, the display module 30 may include the backlight module 2, the display panel 4, the back frame 5, the middle frame 6 and other structures.

Referring to FIG. 1A, the display device 1 may further include a tape 8, and the tape 8 is used to bond the backlight module 2, the display panel 4, the back frame 5 and the middle frame 6 together. The tape 8 may have a rubber coating structure. For example, the tape 8 is bonded to an edge of an upper surface S1 of the display module 30 (also called a first outer surface of the display module), a side surface S2 of the display module 30, and an edge of a lower surface S3 of the display module 30 (also called a second outer surface of the display module). For example, the tape 8 may include a first part 81, a second part 82 and a third part 83. The first part 81 of the tape 8 is bonded to a surface of a side of the middle frame 6 away from the display panel 4 and an edge of the upper surface of the color filter substrate 42, the second part 82 of the tape 8 is bonded to the sidewall of the middle frame 6, and the third part 83 of the tape 8 is bonded to an edge of a surface of a side of the back frame 5 away from the backlight module 2. The tape 8 is a continuously extended tape, that is, the first part 81, the second part 82 and the third part 83 of the tape 8 are connected as a whole. Through the rubber coating structure described above, the tape 8 may fix the display module, so that the backlight module 2 and the display panel 4 are bonded together.

For example, the tape 8 may be made of a light shielding material. For example, the tape 8 may be a black tape. The tape 8 is bonded to the edge of the lower surface S3 of the display module 30, the sidewall S2 of the display module 30 and the edge of the upper surface S1 of the display module 30, so as to shield the light in a whole non-display area of the display device 1, and thereby reducing and even avoiding a light leakage in the display device.

For example, the tape 8 may be made of a conductive material. In this way, the tape 8 may be used for electrostatic release or electrostatic shielding.

Figure 2:
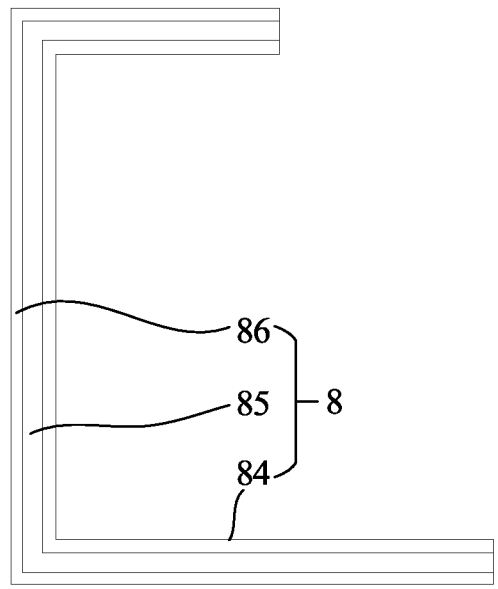
FIG. 2 is a structural diagram of a tape according to the embodiments of the present disclosure.

FIG. 2 shows a structural schematic diagram of a tape according to the embodiments of the present disclosure. Referring to FIG. 2, the tape 8 may include an adhesive layer 84, an aluminum film layer 85 and a light shielding layer 86 stacked in sequence. The adhesive layer 84 is conductive, and the aluminum film layer 85 is doped with black conductive particles.

Figure 3:
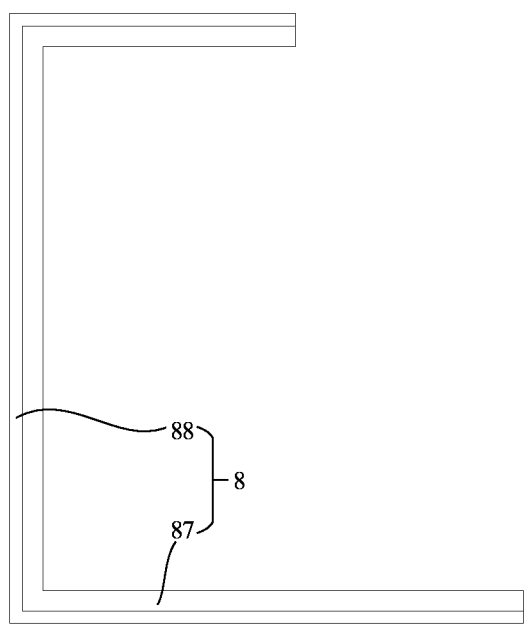
FIG. 3 is a structural diagram of a tape according to the embodiments of the present disclosure.

FIG. 3 is a structural schematic diagram of a tape according to the embodiments of the present disclosure. Referring to FIG. 3, the tape 8 may include an adhesive layer 87 and a substrate layer 88. The adhesive layer 87 is conductive, and the substrate layer 88 is made of a material that is light shielding and conductive. The substrate layer 88 is bonded to the non-display area of the display module 30 through the adhesive layer 87. For example, the adhesive layer 87 is conductive, and the substrate layer 88 may be non-conductive.

Referring back to FIG. 1A, when the display device 1 displays, light generated by the backlight module 2 emits from the upper polarizer 45. To further prevent the light from exiting through the non-display area on a side of the light-emitting surface of the display device 1, an end portion 8A of the tape 8 close to the upper polarizer 45 (that is, an end portion 8A of the first part 81 of the tape 8) abuts the upper polarizer 45. It should be noted that, "an end portion 8A of the tape 8 close to the upper polarizer 45 abuts the upper polarizer 45" indicates that: a side surface of the end portion 8A of the tape 8 and a side surface of the upper polarizer 45 close to the tape 8 may be spaced by a small gap, or the side surface of the end portion 8A of the tape 8 may contact with the side surface of the upper polarizer 45 close to the tape 8. However, the end portion 8A of the tape 8 does not overlap with the upper polarizer 45, which prevents the tape 8 from affecting the light emitted from a display area of the display device 1.

Continuing to refer to FIG. 1A, the display device 1 may further include a cover component 9, an optical adhesive portion 10 and an encapsulation adhesive 11. For example, the cover component 9 may be a cover plate, that is, the cover component 9 may be a glass cover plate. For example, the optical adhesive portion 10 may be composed of water adhesive (also called optical liquid adhesive or OCR). The encapsulation adhesive 11 is annularly arranged between a periphery area of the upper polarizer 45 of the display panel 4 and the cover plate 9. The optical adhesive portion 10 is filled in a space which is between the cover plate 9 and the upper polarizer 45 and is surrounded by the encapsulation adhesive 11. In this way, the cover plate 9 may be completely bonded to the display panel 4 through the optical adhesive portion 10, and is encapsulated by the encapsulation adhesive 11.

Figure 4:
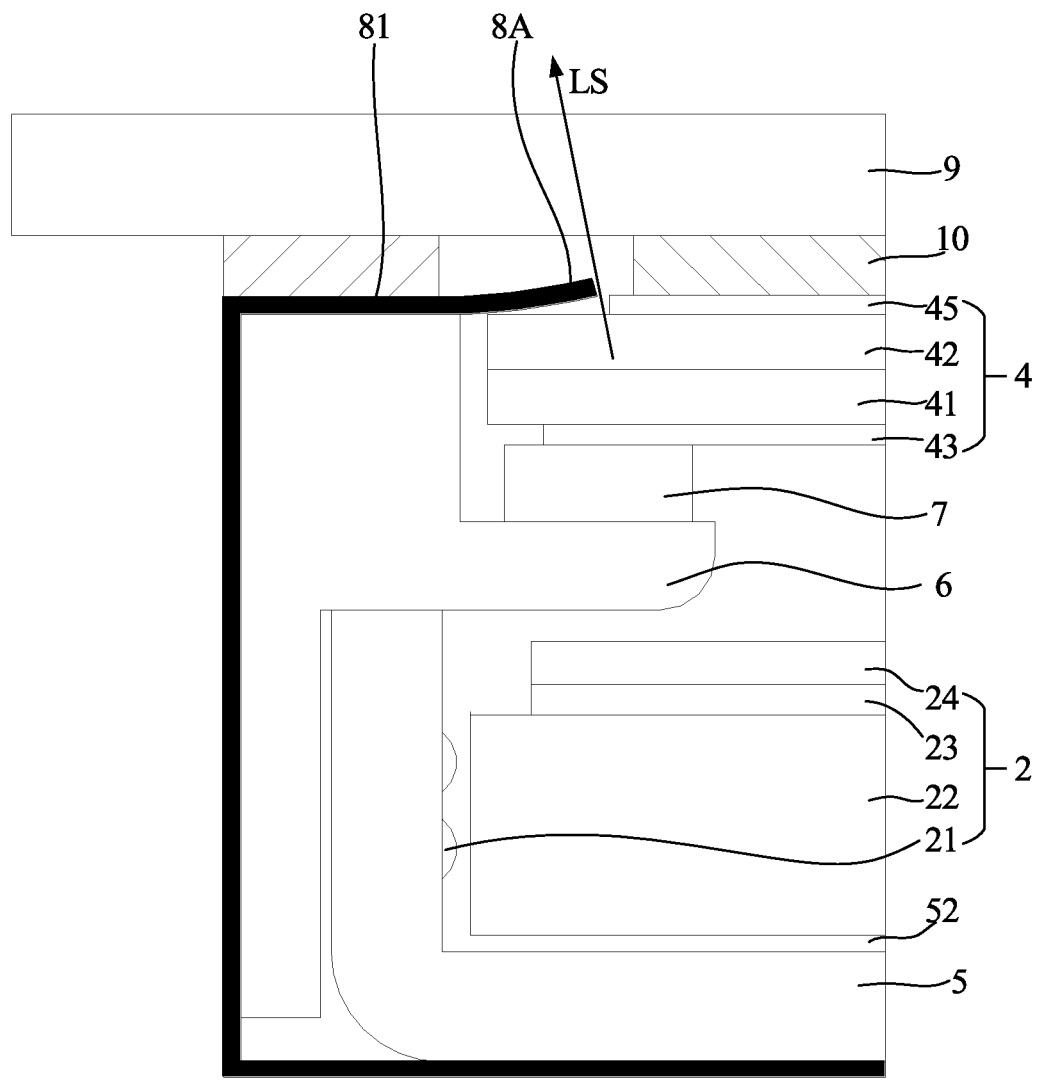
FIG. 4 is a partial structural schematic diagram of an end portion of a tape being lifted.

In an aspect, when the above-mentioned display device 1 is applied to a display device with a narrow frame, a width of the non-display area of the display device 1 is reduced. Referring back to FIG. 1A, a length a of the end portion 8A of the first part 81 of the tape 8 which is bonded to the edge portion of the upper surface of the color filter substrate 42 is reduced. For example, when being applied in a display device with a narrow frame in a moving object such as vehicles, etc., the length a is generally less than 1.2 mm. At this time, the end portion 8A of the tape 8 may be warped due to an insufficient bonding intensity, as shown in FIG. 4. Referring to FIG. 4, due to the end portion 8A of the tape 8 is warped, the light generated by the backlight module 2 may exit through a gap caused by the warped tape 8 instead of the upper polarizer 45 (as indicated by an arrowed line LS in FIG. 4), and may result in light leakage or bright stripes (also called a cross-light phenomenon) in an edge area.

Figure 5A:
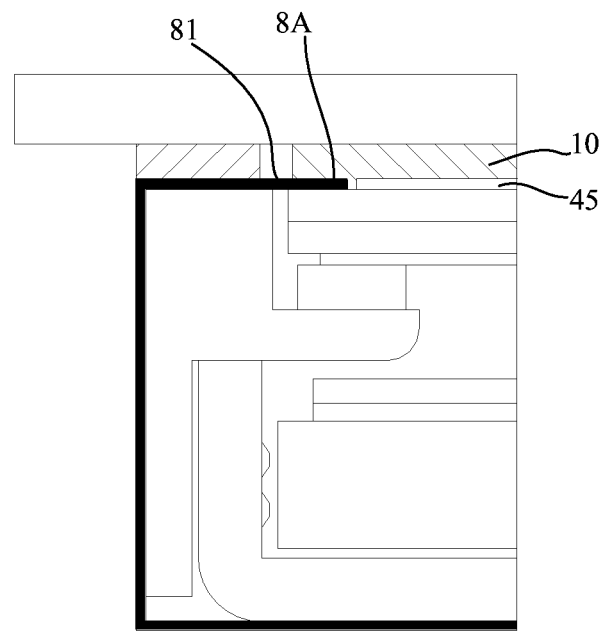
FIG. 5A is a partial structural schematic diagram of a display device according to the embodiments of the present disclosure.
Figure 5B:
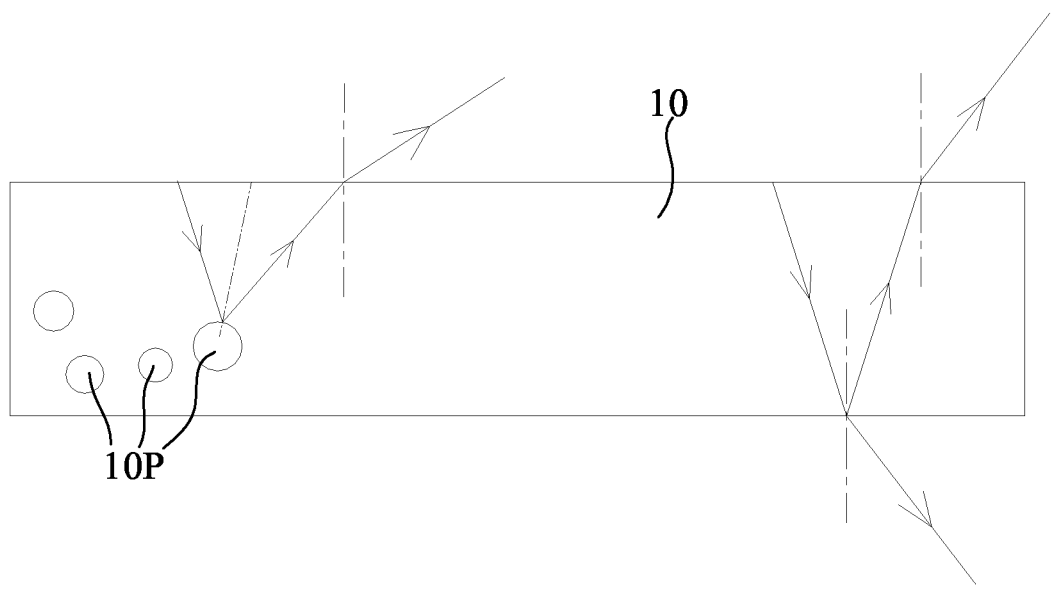
FIG. 5B is a schematic diagram schematically shows a total reflection on bubbles formed inside a water-adhesive.

In another aspect, in order to avoid the cross-light phenomenon, the optical adhesive portion 10 such as the water adhesive is coated on the end portion 8A of the first part 81 of the tape 8, so as to press the end portion 8A of the tape 8 and prevent the end portion 8A from warping, which is shown in FIG. 5A. However, if the optical adhesive portion 10 such as the water adhesive is coated on the tape 8, a bright stripe is prone to form at a position where the water adhesive 10 and the tape 8 overlap, that is, prone to occur a "bright stripe at the edge of the adhesive" phenomenon. A reason of the occurrence of the "bright stripe at the edge of the adhesive" phenomenon may be: properties of the surface of the upper polarizer 45 and the surface of the tape 8 are different. For example, the surface of the tape 8 is rougher than the surface of the upper polarizer 45. Thus, the water adhesive 10 coated on the tape 8 is prone to form bubbles 10P inside, as shown in FIG. 5B. As a result, light (such as external light) may be reflected at the bubbles 10P, a large amount of reflections may result in a part where the bubbles are formed in the water adhesive 10 to be brighter, that is, bright stripes are prone to form at the position where the water adhesive 10 and the tape 8 overlap, so as to occur the "bright stripe at the edge of the adhesive" phenomenon. Moreover, in addition to the external light directly radiating on the bubbles 10P, the "bright stripe at the edge of the adhesive" phenomenon may also occur due to: the external light or the light emitting from the display panel enters the water adhesive between the upper polarizer and the cover plate, a part of the light is totally reflected on upper and lower interfaces of the water adhesive and transmitted to an edge of the adhesive, since the total reflection is affected by the bubbles 10P, the "bright stripe at the edge of the adhesive" phenomenon is thereby aggravating.

Figure 6:
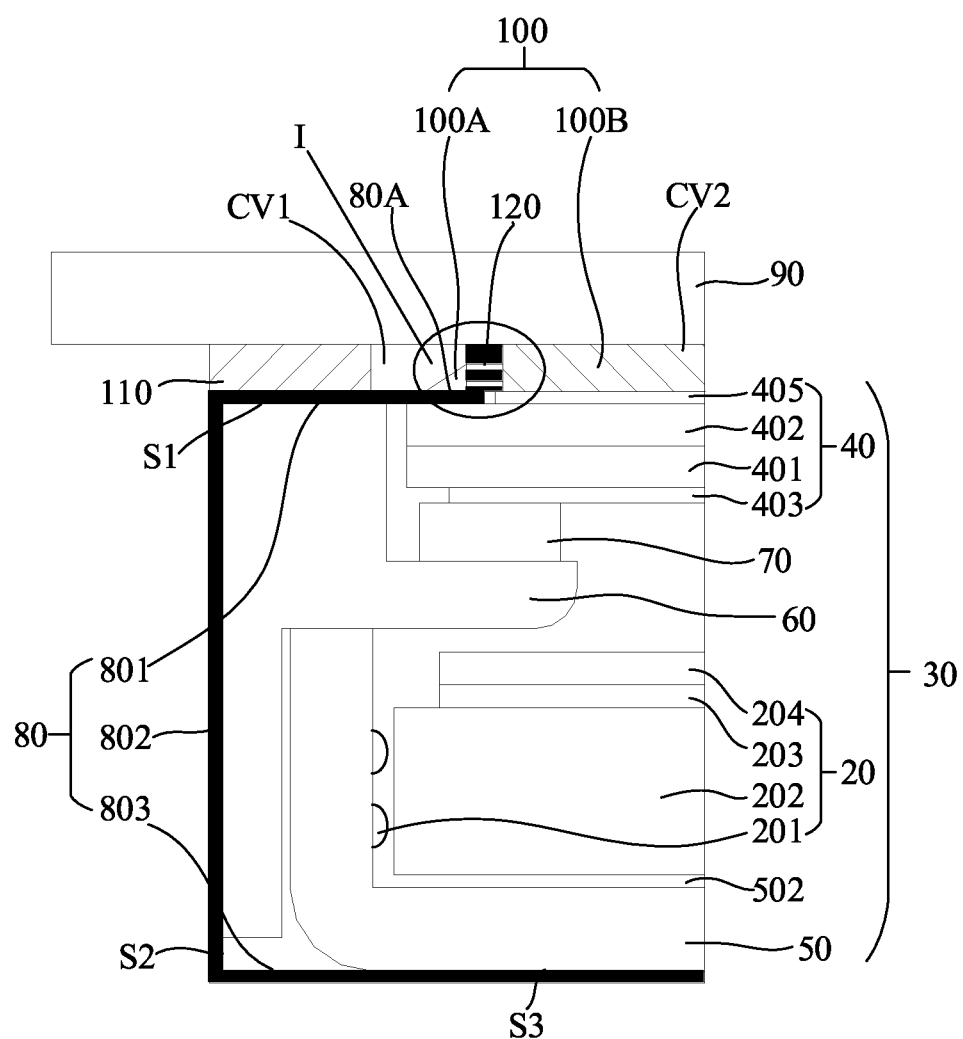
FIG. 6 is a partial structural schematic diagram of a display device according to the embodiments of the present disclosure.

In order to avoid the above-mentioned cross-light phenomenon and the "bright stripe at the edge of the adhesive" phenomenon, the embodiments of the present disclosure further provide a display device with a tape holder. FIG. 6 shows a partial structural schematic diagram of a display device according to the embodiments of the present disclosure. Referring to FIG. 6, the display device 10 may include a display module 30, and the display module 30 may include a backlight module 20, a display panel 40 such as a liquid crystal display panel, a back frame 50 and a middle frame 60.

For example, the backlight module 20 may include a light source 201 and an optical film set. For example, the optical film set may include a diffusion sheet 203, a brightness enhancement sheet 204 and other optical film sheets. It should be understood that, the optical film set may further include other types of optical film sheets and the types of the optical film sheets included in the optical film set may be selected according to actual needs. For example, the light source 201 may include a plurality of light-emitting diodes (LED). Further, for example, the backlight module 20 may be a side backlight module, and the backlight module 20 may include a light guide plate 202. As shown in FIG. 6, the light source 201 may be arranged on a side of the light guide plate 202, and the side of the light guide plate 202 is called a light incident surface of the light guide plate 202. Light emitted from the light source 21 is scattered by the light guide plate 22 and then emitted from a light-emitting surface of the light guide plate 22, and then forms a planar light source after passing through the optical film set.

Referring to FIG. 6, the display panel 40 may include two substrates arranged opposite to each other. For example, the two substrates may be an array substrate 401 and a color filter substrate 402. It should be understood that, the display panel 40 may further include a liquid crystal layer between the array substrate 401 and the color filter substrate 402. Base substrates of the array substrate 401 and the color filter substrate 402 may be glass. In addition, it should be noted that, the array substrate 401 and the color filter substrate 402 may adopt the common structures in the art, which will not be repeated herein.

The display panel 40 may further include a lower polarizer 403 and an upper polarizer 405. In the embodiment shown in FIG. 6, the lower polarizer 403 is arranged on a lower surface of the array substrate 401, and the upper polarizer 405 is arranged on an upper surface of the color filter substrate 402.

Referring to FIG. 6, the back frame 50 is provided with an accommodation space 502 for accommodating the backlight module 20. The middle frame 60 is used to carry the display panel 40. For example, a buffer element 70, such as buffer foam, is arranged between a bearing surface of the middle frame 6 and the lower polarizer 403 of the display panel 40.

In this way, as shown in FIG. 6, the display module 30 may include an upper surface S1 (also called a first outer surface), a side surface S2 and a lower surface S3 (also called a second outer surface). The lower surface S3 and the upper surface S1 are arranged opposite to each other, the side surface S2 connects the lower surface S3 and the upper surface S1, and the upper surface S1 is located on a light-emitting side of the display module. For example, the lower surface S3 is located on a side of the back frame 50 away from the backlight module 20, the upper surface S1 is located on a side of the middle frame 60 and the display panel 40 away from the backlight module 20, and the side surface S2 is located on a side of the middle frame 60 away from the backlight module 20.

Referring to FIG. 6, the display device 10 may further include a tape 80, and the tape 80 is used to fix the display module 30 and thereby bonding the backlight module 20 and the display panel 40 together. The tape 80 may have a rubber coating structure. For example, the tape 80 is bonded to an edge of the upper surface S1 of the display module 30 (also called a first outer surface of the display module), a side surface S2 of the display module 30 and an edge of the lower surface S3 (also called a second outer surface) of the display module 30. For example, the tape 80 may include a first part 801, a second part 802 and a third part 803. The first part 801 of the tape 80 is bonded to a surface of a side of the middle frame 60 away from the display panel 40 and an edge of the upper surface of the color filter substrate 402, the second part 802 of the tape 80 is bonded to the sidewall of the middle frame 60, and the third part 803 of the tape 80 is bonded to an edge of a surface of a side of the back frame 50 away from the backlight module 20. The tape 80 is a continuously extended tape, that is, the first part 801, the second part 802 and the third part 803 of the tape 80 are connected as a whole. Through the rubber coating structure described above, the tape 80 may fix the display module 30, so that the backlight module 20 and the display panel 40 are bonded together.

For example, the tape 80 may be made of a light shielding material. For example, the tape 80 may be a black tape. The tape 80 is bonded to the edge of the lower surface S3 of the display module 30, the side surface S2 of the display module 30 and the edge of the upper surface S1 of the display module 30, so as to shield the light in a whole non-display area of the display device 10, and thereby reducing and even avoiding a light leakage in the display device.

For example, the tape 80 may be made of a conductive material. In this way, the tape 80 may be used for electrostatic release or electrostatic shielding.

Referring back to FIG. 2, the tape 80 may have a same structure as the tape 8, that is, the tape 80 may include an adhesive layer 84, an aluminum film layer 85 and a light shielding layer 86 stacked in sequence. The adhesive layer 84 is conductive and the aluminum film layer 85 is doped with black conductive particles.

Referring back to FIG. 3, the tape 80 may have a same structure as the tape 8, that is, the tape 80 may include an adhesive layer 87 and a substrate layer 88 stacked in sequence. The adhesive layer 87 is conductive and the substrate layer 88 is made of a material that is light shielding and conductive. The substrate layer 88 is bonded to the non-display area of the display module 30 through the adhesive layer 87. For example, the adhesive layer 87 is conductive, and the substrate layer 88 may be non-conductive.

Referring to FIG. 6, when the display device 10 displays, light generated by the backlight module 20 emits from the upper polarizer 405. To further prevent the light from exiting through the non-display area on a side of the light-emitting surface of the display device 10, an end portion 80A of the tape 80 close to the upper polarizer 405 (that is, an end portion 80A of the first part 801 of the tape 80) abuts the upper polarizer 405. It should be noted that, "an end portion 80A of the tape 80 close to the upper polarizer 405 abuts the upper polarizer 405" indicates that: a side surface of the end portion 80A of the tape 80 and a side surface of the upper polarizer 405 close to the tape 80 may be spaced by a small gap, or the side surface of the end portion 80A of the tape 80 may contact with the side surface of the upper polarizer 405 close to the tape 80. However, the end portion 80A of the tape 80 does not overlap with the upper polarizer 405, which prevents the tape 80 from affecting the light emitted from a display area of the display device 10.

Continuing to refer to FIG. 6, the display device 10 may further include a cover component 90, a water adhesive 100 (also called optical liquid adhesive or OCR) and an encapsulation adhesive 110. For example, the cover component 90 may be a cover plate, that is, the cover component 90 may be a glass cover plate. The encapsulation adhesive 110 is annularly arranged between a periphery area of the upper polarizer 405 of the liquid crystal display panel 40 and the cover plate 90. The water adhesive 100 is filled in a space which is between the cover plate 90 and the upper polarizer 405 and is surrounded by the encapsulation adhesive 110. In this way, the cover plate 90 may be completely bonded to the display panel 40 through the water adhesive 100, and is encapsulated by the encapsulation adhesive 110.

As shown in FIG. 6, the cover component 90 and the display module 30 are arranged opposite to each other and spaced apart. The "arranged opposite to each other and spaced apart" here means that: the cover component 90 and the display module 30 are arranged oppositely and a certain interval exist between the cover component 90 and the display module 30. For example, a surface (a lower surface in FIG. 6) of the cover component 90 facing the display module 30 and a surface (an upper surface in FIG. 6) of the display module 30 facing the cover component 90 are arranged oppositely and there is a certain interval between the lower surface and the upper surface. For example, as the encapsulation adhesive 110 and the optical adhesive portion 100 such as water adhesive (which may be described in detail below) are provided, there is a certain interval between the surface (the lower surface in FIG. 6) of the cover component 90 facing the display module 30 and the surface (the upper surface in FIG. 6) of the display module 30 facing the cover component 90.

Figure 7:
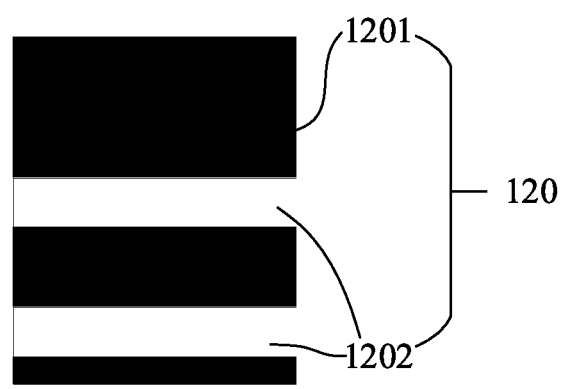
FIG. 7 is a structural schematic diagram of a tape holder included in a display device according to the embodiments of the present disclosure.

Continuing to refer to FIG. 6, the display device 10 may further include a tape holder 120. FIG. 7 is a structural schematic diagram of a tape holder included in a display device according to the embodiments of the present disclosure. Referring to FIG. 6 and FIG. 7 in conjunction, the tape holder 120 may include a main body portion 1201 and a through hole 1202. At least a part of the main body portion 1201 is pressed on the tape 80. In the embodiment shown in FIG. 6, at least a part of the main body portion 1201 is pressed on the first part 801 of the tape 80, for example, at least a part of the main body portion 1201 is pressed on the end portion 80A of the first part 801 of the tape 80, that is, an orthographic projection of the main body portion 1201 on the display panel 40 at least partially overlaps with an orthographic projection of the first part 801 of the tape 80 on the display panel 40. In this way, by providing the tape holder 120, at least a part of the main body portion 1201 of the tape holder 120 is pressed on the first part 801 of the tape 80, for example, at least a part of the main body portion 1201 is pressed on the end portion 80A of the first part 801 of the tape 80. The encapsulation adhesive 110 is closer to the side surface S2 of the display module 30 relative to the tape holder 120. In this way, referring to FIG. 6, the main body portion 1201 is arranged between the cover plate 90 and the display module 30, and is at least pressed on the end portion 80A of the first part 801 of the tape 80. In this way, a space between the cover plate 90 and the display module 30 is divided into a first space and a second space. For example, a first space CV1 is formed between the cover plate 90 and the first part 801 of the tape 80, and a second space CV2 is formed between the cover plate 90 and the upper polarizer 405.

Figure 8A:
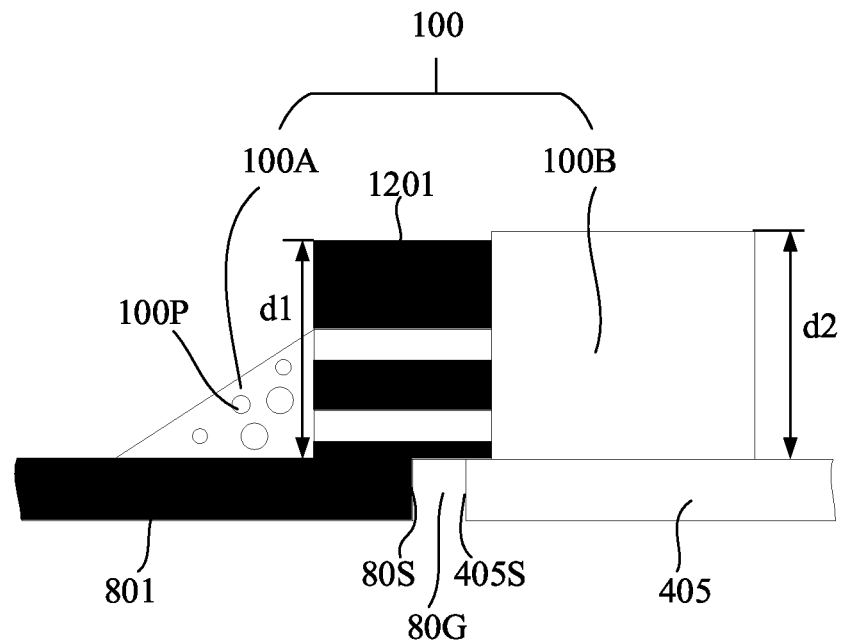
FIGS. 8A to 8D are enlarged views of a display device according to some embodiments of the present disclosure at a portion I in FIG. 6.

FIG. 8A is an enlarged view of a display device according to some exemplary embodiments of the present disclosure at part I in FIG. 6. Referring to FIG. 8A, another part of the main body portion 1201 is also pressed on the upper polarizer 405, that is, an orthographic projection of the main body portion 1201 on the display panel 40 and an orthographic projection of the upper polarizer 405 on the display panel 40 partially overlap. For example, a side surface 80S of the first part 801 of the tape 80 close to the upper polarizer 405 and a side surface 405S of the upper polarizer 405 close to the tape 80 has a small gap 80G. The tape holder 120 runs across the gap 80G, so that a first part of the main body portion 1201 of the tape holder 120 is pressed on the tape 80, a second part of the main body portion 1201 is pressed on the upper polarizer 405, and a third part of the main body portion 1201 corresponds to the interval 80G.

Figure 8B:
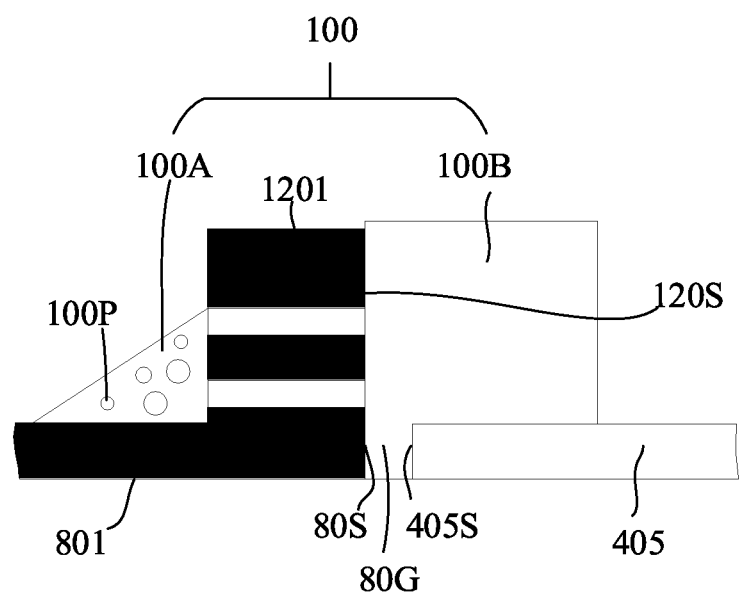

FIG. 8B is an enlarged view of a display device according to some exemplary embodiments of the present disclosure at part I in FIG. 6. Referring to FIG. 8B, the main body portion 1201 is not pressed on the upper polarizer 405, that is, the orthographic projection of the main body portion 1201 on the display panel 40 and the orthographic projection of the upper polarizer 405 on the display panel 40 do not overlap. For example, the side surface 80S of the first part 801 of the tape 80 close to the upper polarizer 405 and the side surface 405S of the upper polarizer 405 close to the tape 80 has a small gap 80G, and the tape holder 120 does not run across the gap 80G. For example, a side surface 120S of the main body portion 1201 of the tape holder 120 facing the second space CV2 is flush with the side surface 80S of the first part 801 of the tape 80, as shown in FIG. 8B. For example, the tape holder 120 may cover a part of the gap 80G, and the side surface 120S of the main body portion 1201 of the tape holder 120 facing the second space CV2 is closer to the upper polarizer 405 than the side surface 80S of the first part 801 of the tape 80; alternatively, the side surface 80S of the first part 801 of the tape 80 is closer to the side surface S2 of the display module 30 than the side surface 120S of the main body portion 1201 of the tape holder 120 facing the second space CV2.

Figure 8C:
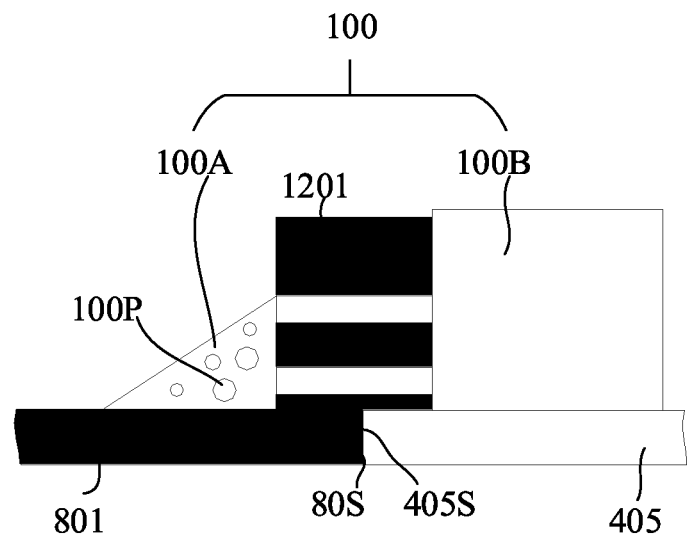

FIG. 8C is an enlarged view of a display device according to some other exemplary embodiments of the present disclosure at part I in FIG. 6. Referring to FIG. 8C, the side surface 80S of the first part 801 of the tape 80 is in contact with the side surface 405S of the upper polarizer 405 close to the tape 80, and a part of the main body portion 1201 of the tape holder 120 is pressed on the first part 801 of the tape 80, that is, the orthographic projection of main body portion 1201 on the display panel 40 partially overlaps with the orthographic projection of the first part 801 of the tape 80 on the display panel 40; another part of the main body portion 1201 is pressed on the upper polarizer 405, that is, the orthographic projection of the main body portion 1201 on the display panel 40 partially overlaps with the orthographic projection of the upper polarizer 405 on the display panel 40.

Figure 8D:
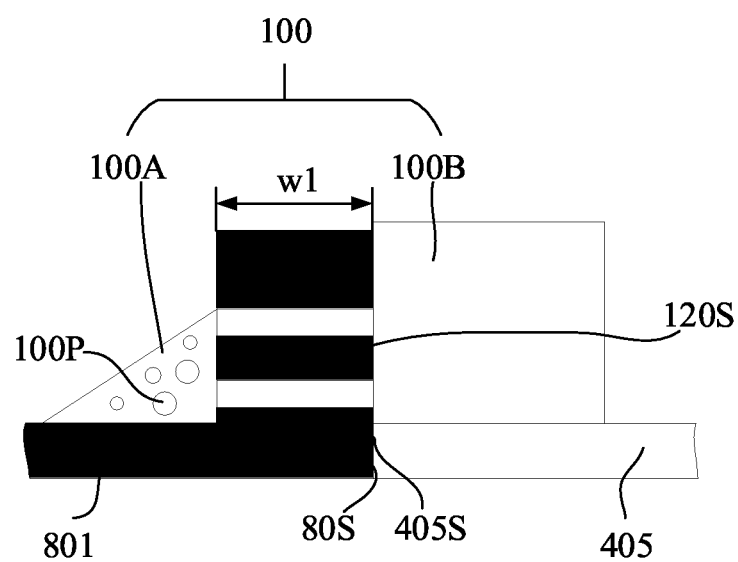

FIG. 8D is an enlarged view of a display device according to some other exemplary embodiments of the present disclosure at part I in FIG. 6. Referring to FIG. 8D, the side surface 80S of the first part 801 of the tape 80 is in contact with the side surface 405S of the upper polarizer 405 close to the tape 80, and the main body portion 1201 of the tape holder 120 is completely pressed on the tape 80, that is, the orthographic projection of the main body portion 1201 of the tape holder 120 on the display panel 40 falls within the orthographic projection of the first part 801 of the tape 80 on the display panel 40. The main body portion 1201 is not pressed on the upper polarizer 405, that is, the orthographic projection of the main body portion 1201 on the display panel 40 does not overlap with the orthographic projection of the upper polarizer 405 on the display panel 40. In addition, the side surface 120S of the main body portion 1201 of the tape holder 120 facing the second space CV2 is flush with the side surface 80S of the first part 801 of the tape 80.

In the embodiments of the present disclosure, the tape holder 120 presses or covers at least the end portion 80A of the first part 801 of the tape 80. For example, an orthographic projection of the side surface 80S of the first part 801 of the tape 80 close to the upper polarizer 405 on the display panel 40 falls within the orthographic projection of the main body portion 1201 of the tape holder 120 on the display panel 40.

In the embodiments of the present disclosure, for ease of arranging the tape holder 120, a surface of the first part 801 of the tape 80 facing the cover plate 90 (that is, an upper surface of the first part 801 of the tape 80) is substantially flush with a surface of the upper polarizer 405 facing the cover plate 90 (that is, an upper surface of the upper polarizer 405), that is, the upper surface of the first part 801 of the tape 80 and the upper surface of the upper polarizer 405 are substantially at a same height.

It should be noted that the expression "substantially flush" used in the present disclosure includes a case that a plurality of layers or surfaces are completely flush, and also includes a case that height differences of the plurality of layers or surfaces are within an allowable range of processing error. For example, the surface of the first part 801 of the tape 80 facing the cover plate 90 is substantially flush with the surface of the upper polarizer 405 facing the cover plate 90 includes: the surface of the first part 801 of the tape 80 facing the cover plate 90 is completely flush with the surface of the upper polarizer 405 facing the cover plate 90, or there is a height difference between the surface of the first part 801 of the tape 80 facing the cover plate 90 and the surface of the upper polarizer 405 facing the cover plate 90, however, the height difference is within the allowable range of processing error.

Referring to FIGS. 6 to 8D in conjunction, the through hole 1202 of the tape holder 120 communicates the first space CV1 with the second space CV2, thereby allowing a part of the water adhesive 100 to enter the first space CV1 from the second space CV2 through the through hole 1202. In this way, a part of the water adhesive 100 may be pressed on the first part 801 of the tape 80, as shown in FIGS. 8A to 8D. Therefore, in the embodiments of the present disclosure, both the tape holder 120 and a part of the water adhesive 100 may press the end portion 80A of the tape 80, which may prevent the end portion 80A of the tape 80 from being warped, and thereby avoiding the cross-light phenomenon. For example, referring to FIGS. 6 to 8D, the display device 10 includes a first optical adhesive portion 100A and a second optical adhesive portion 100B made of water adhesive or the like. It should be understood that since the through hole 1202 of the tape holder 120 communicates the first space CV1 with the second space CV2, a part of the water adhesive 100 is allowed to enter the first space CV1 from the second space CV2 through the through hole 1202, the part of the water adhesive 100 entering the first space CV1 through the through hole 1202 may form the first optical adhesive portion 100A in the first space CV1. The first space CV1 is closer to the side surface S2 of the display module 30 than the second space CV2. The first optical adhesive portion 100A is located in the first space CV1 and presses on at least a part of the first part 801 of the tape 80. The second optical adhesive portion 100B completely fills the second space CV2, that is, the optical adhesive portion 100 completely fills the space between the cover plate 90 and the upper polarizer 405, so that the display module 30 and the cover plate 90 are completely bonded. In addition, the first optical adhesive portion 100A pressed on at least a part of the first part 801 of the tape 80 may also improve an adhesion of the first part 801 of the tape 80, so that the tape 80 may be better bonded to the edge of the upper surface S1 (also called the first outer surface) of the display module 30.

Further, the main body portion 1201 of the tape holder 120 is made of a light shielding material. For example, the main body portion 1201 may be made of a black rubber material, or the main body portion 1201 may be made of a silicone rubber prepared by adding black pigments, or the main body portion 1201 may be made of other light shielding materials with certain elasticity. In this way, referring to FIGS. 8A to 8D, even bubbles 100P may be formed inside the water adhesive 100 coated on the tape 80, which may cause the light (such as external light) to be reflected at the bubbles 100P (in conjunction with FIG. 5), a large amount of reflected light may be blocked by the main body portion 1201 of the tape holder 120, that is, the large amount of the reflected light may not enter an visible area and be observed by the user. Therefore, the "bright stripe at the edge of the adhesive" phenomenon is avoided.

In the embodiments of the present disclosure, the tape holder 120 at least blocks the side surface 80S of the tape 80 facing the upper polarizer 405, so that the bubbles 100P may be generated outside the tape holder 120, and in particular, on a side of the tape holder 120 away from the upper polarizer 405, and thereby ensuring that the light that is totally reflected by the bubbles 100P is completely blocked by the main body portion 1201 of the tape holder 120.

Figure 9:
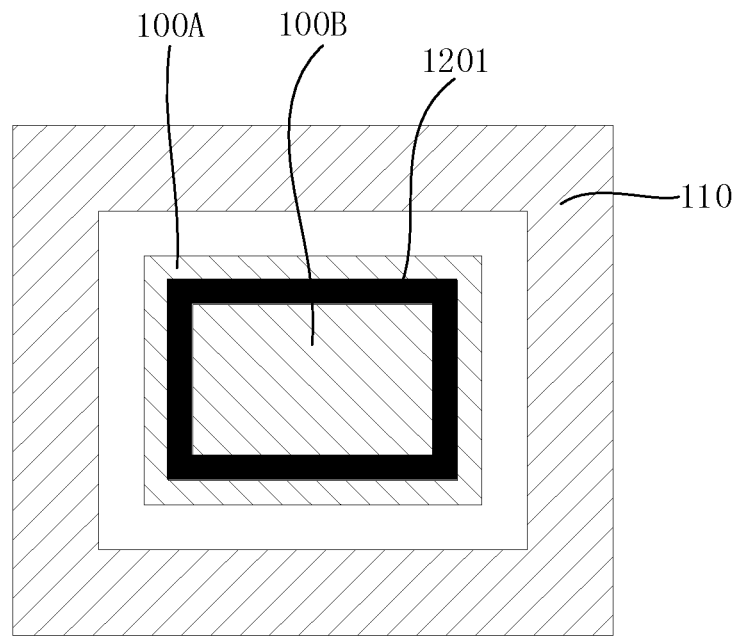
FIG. 9 is a plan view of a display device according to the embodiments of the present disclosure, which schematically shows relationships between a tape holder, a first optical adhesive portion, a second optical adhesive portion and an encapsulation adhesive included in the display device.
Figure 10:
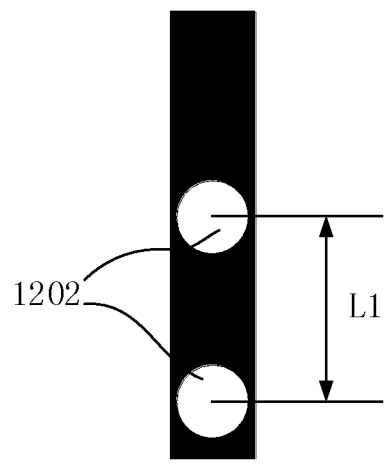
FIG. 10 is a side view of the tape holder shown in FIG. 7.

FIG. 9 is a plan view of a display device according to the embodiments of the present disclosure, and relationships between a tape holder 120, a first optical adhesive portion 100A, a second optical adhesive portion 100B, and an encapsulation adhesive 110 is shown in FIG. 9. FIG. 10 is a side view of the tape holder 120 shown in FIG. 7. Referring to FIGS. 7 to 10 in conjunction, the tape holder 120 includes a main body portion 1201 with a closed shape, that is, the tape holder 120 is annularly arranged surrounding a periphery of the second optical adhesive portion 100B. A thickness of the main body portion 1201 may be substantially equal to a distance between the display module 30 and the cover plate 90, that is, a thickness d1 of the main body portion 1201 may be substantially equal to a thickness d2 of the second optical adhesive portion 100B. It should be noted that "substantially equal to" here means that the thickness d1 of the main body portion 1201 may be equal to the thickness d2 of the second optical adhesive portion 100B, or the thickness d1 of the main body portion 1201 may be smaller than that of the second optical adhesive portion 100B, and a difference between d2 and d1 is less than or equal to 0.1 mm. For example, the difference between d2 and d1 may be in a range of 0.05 to 0.1 mm, or the difference between d2 and d1 may be 0.05 mm. In the embodiments of the present disclosure, the thickness d1 of the main body portion 1201 is set to be no greater than the thickness d2 of the second optical adhesive portion 100B, which may avoid the generation of an air gap between the upper polarizer 405 and the cover plate 90. Moreover, in consideration of the influence of processing accuracy, the thickness d1 of the main body portion 1201 being set to be substantially equal to the thickness d2 of the second optical adhesive portion 100B is beneficial to the manufacture of the tape holder. It should also be noted that the thickness d2 of the second optical adhesive portion 100B may be determined according to the bonding process. For example, it may be 0.6 to 0.8 mm, or 0.3 to 0.4 mm.

A width w1 of the main body portion 1201 may be selected according to actual needs. For example, the width w1 of the main body portion 1201 may be about 1.5 mm.

It should be noted that the embodiments of the present disclosure do not limit a shape of a cross section of the through hole 1202 of the tape holder 120. For example, in the embodiment shown in FIG. 10, the cross section of the through hole 1202 is circular. For another example, a diameter of the circular through hole 1202 may be greater than 0.1 mm, so as to facilitate the processing of the through hole 1202. A number of through holes 1202 included in the tape holder 120 is not limited, and the number of the through holes 1202 may be determined according to the thickness d1 of the main body portion 1201. For example, in a case that the thickness d1 of the main body portion 1201 is small, for example, less than 0.4 mm, one through hole 1202 may be provided; and in a case that the thickness d1 of the main body portion 1201 is large, for example, greater than 0.4 mm, two or more through holes 1202 may be provided. The embodiments of the present disclosure do not limit a distance between the through holes 1202. For example, in the embodiment shown in FIG. 10, a distance L1 between central axes of two adjacent through holes 1202 may be about 0.4 mm. In a case that the display device includes more than two through holes 1202, each through hole 1202 communicates the first space CV1 with the second space CV2.

For example, the tape holder 120 may be made of a black rubber material and made by a molding processing method. However, the embodiments of the present disclosure are not limited thereto, and the tape holder 120 may be made of other suitable materials and other suitable processing methods.

Figure 11:
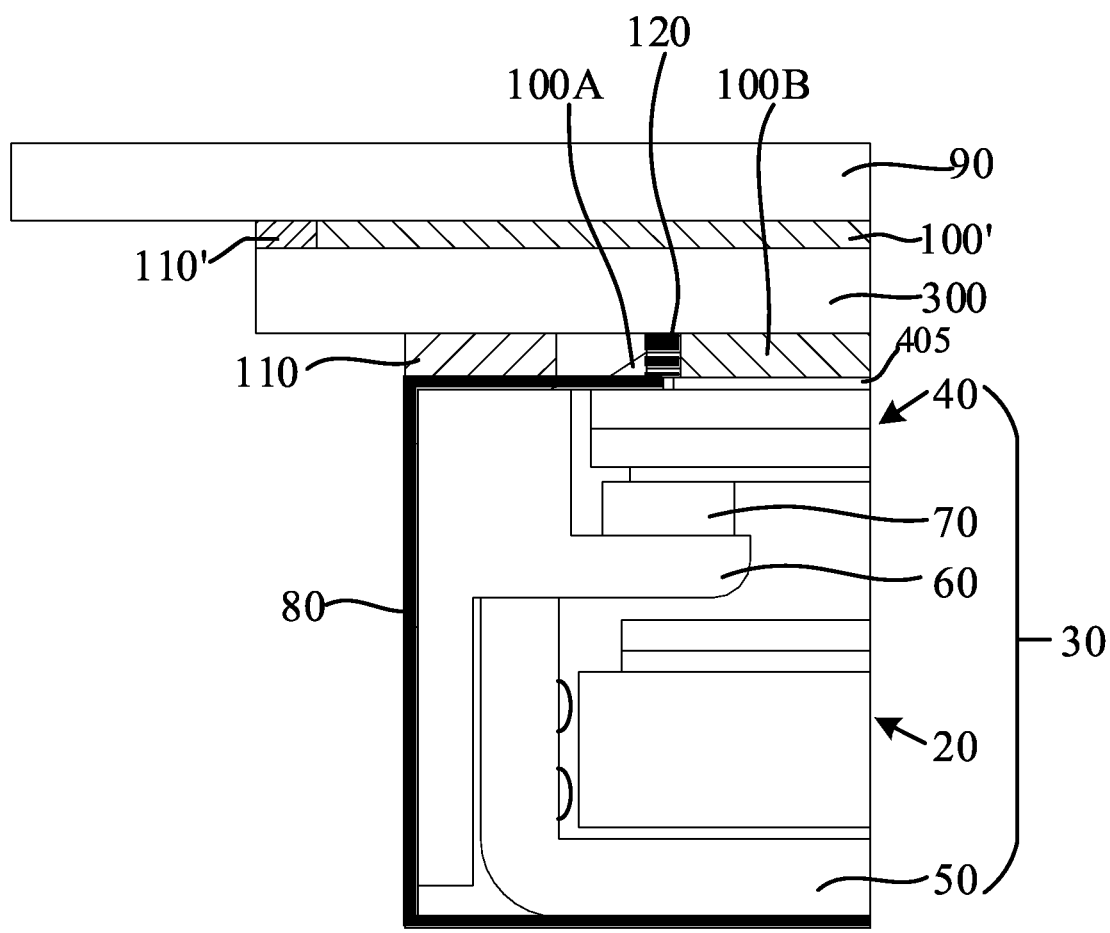
FIG. 11 is a partial structural schematic diagram of a display device according to the embodiments of the present disclosure.

FIG. 11 is a partial structural schematic diagram of a display device according to the embodiments of the present disclosure. Referring to FIG. 11, the display device 10 may include a display module 30, and the display module 30 includes a backlight module 20, a display panel 40 such as a liquid crystal display panel, a back frame 50, a middle frame 60, and a buffer element 70. The display device 10 may further include a tape 80, a first optical adhesive portion 110A, a second optical adhesive portion 110B, an encapsulation adhesive 110 and a tape holder 120. The display device 10 may further include a cover component, and the cover component includes a touch panel formed by bonding a touch substrate 300 and a cover plate 90, that is, the display device 10 may be a touch display device. It should be noted that the components and the structures of the display device in the embodiment shown in FIG. 11 may refer to the components and structures of the display devices in the various embodiments described above with respect to FIGS. 6 to 10. The following will focus on components and structures not described in the various embodiments described above.

As shown in FIG. 11, for example, the touch substrate 300 is arranged on a side of the upper polarizer 405 away from the display panel 40, and the encapsulation adhesive 110, the tape holder 120, the first optical adhesive portion 110A, and the second optical adhesive portion 110B are all arranged between the upper polarizer 405 and the touch substrate 300. The cover plate 90 (for example, a transparent cover plate 90) is arranged on a side of the touch substrate 300 away from the display panel 40, and an encapsulation adhesive 110' and a water adhesive 100' are arranged between the touch substrate 300 and the cover plate 90 for bonding the touch substrate 300 and the cover plate 90.

It should be understood that the display device in the embodiment shown in FIG. 11 may realize all the features and advantages of the display device in the various embodiments described above with respect to FIGS. 6 to 10, which will not be repeated here.

For example, the display device in the various embodiments described above may be an on-board display device applied to a moving object such as a vehicle, or may be, for example, a display device such as a notebook computer. Of course, the embodiments of the present disclosure are not limited to this. For example, the display device may be, for example, a smart phone, a wearable smart watch, smart glasses, a tablet computer, a television, a display, a digital photo frame, a navigator, an on-board display, an e-book and any product or component with a display function.

Figure 12:
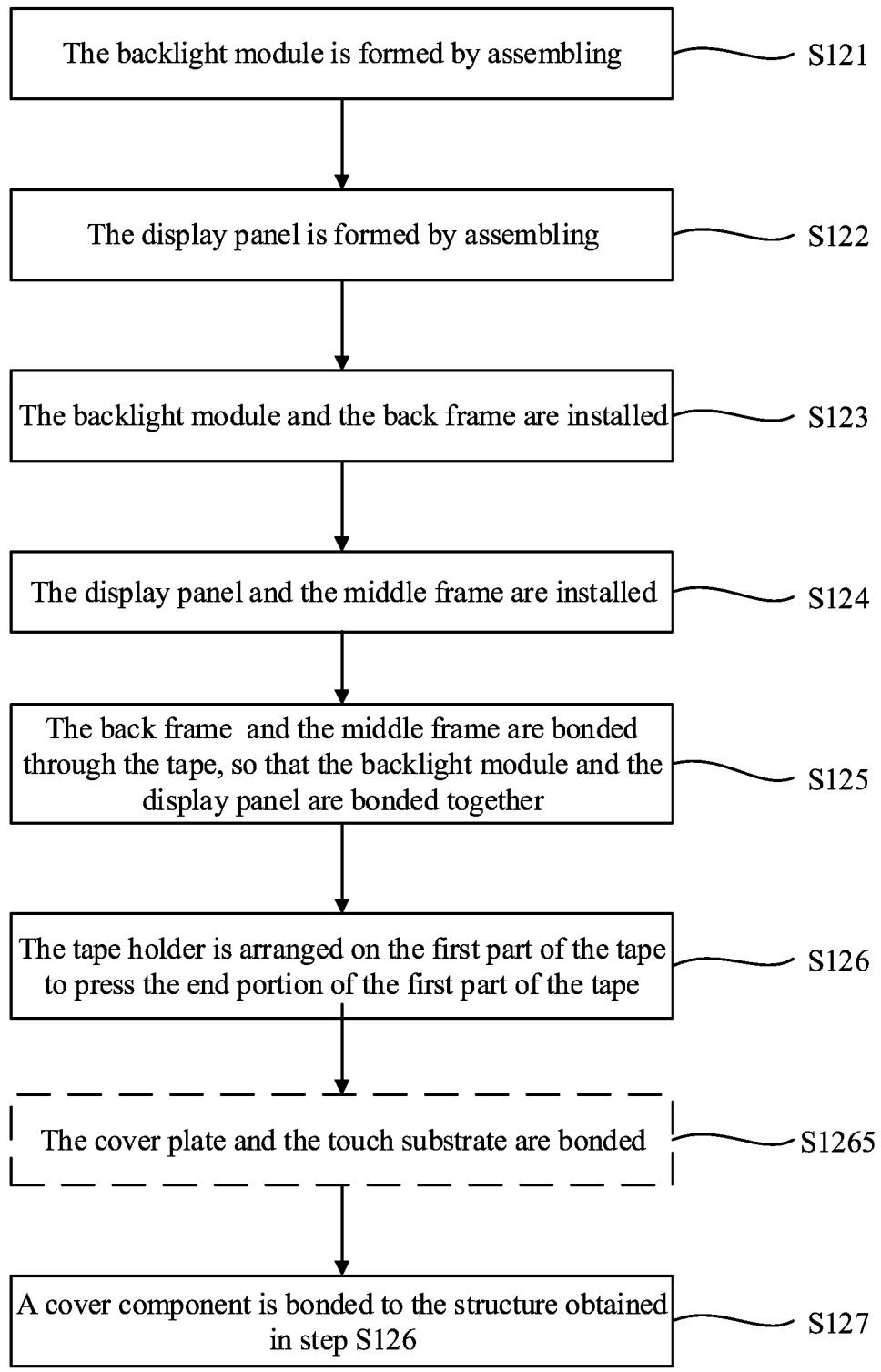
FIG. 12 is a flowchart of a method for manufacturing a display device according to the embodiments of the present disclosure.

FIG. 12 is a flowchart of a method for manufacturing a display device according to the embodiments of the present disclosure. Referring to FIG. 6 and FIG. 12 in conjunction, the method for manufacturing the display device may be performed according to the following steps. It should be noted that some steps of the method may be executed individually or in combination, and may be executed in parallel or sequentially, and are not limited to a specific operation sequence shown in FIG. 12.

In step S121, the backlight module 20 is formed by assembling. For example, components such as the light source 201, the light guide plate 202, and the optical film set, etc. are assembled to form a complete backlight module 20.

In step S122, the display panel 40 is formed by assembling. For example, the array substrate 401 and the color filter substrate 402 are aligned, and then the lower polarizer 403 and the upper polarizer 405 are respectively bonded to the array substrate 401 and the color filter substrate 402, so as to form the display panel 40.

In step S123, the backlight module 20 and the back frame 50 are installed. For example, the backlight module 20 is installed in the accommodation space 502 of the back frame 50.

In step S124, the display panel 40 and the middle frame 60 are installed. For example, the buffer element 70 such as buffer foam is arranged on the bearing surface of the middle frame 60, and then the display panel 40 is arranged on the buffer element 70.

In step S125, the back frame 50 and the middle frame 60 are bonded through the tape 80, so that the backlight module 20 and the display panel 40 are bonded together. For example, the tape 80 may include the first part 801, the second part 802, and the third part 803. The first part 801 of the tape 80 is bonded to the surface of the middle frame 60 away from the display panel 40 and the edge of the upper surface of the color filter substrate 402, the second part 802 of the tape 80 is bonded to the sidewall S2 of the middle frame 60, and the third part 803 of the tape 80 is bonded to the edge of the surface S3 of the back frame 50 away from the backlight module 20.

In step S126, the pitch component 120 is arranged on the first part 801 of the tape 80 to press the end portion 80A of the first part 801 of the tape 80.

In step S127, a cover component such as the cover plate 90 is bonded to the structure obtained in step S126. For example, in this step, the encapsulation adhesive 110 is coated, so that the encapsulation adhesive 110 is annularly arranged on the periphery of the upper polarizer 405 of the display panel 40; the water adhesive 100 is coated to cover the upper polarizer 405; and the cover plate 90 is bonded, and during the bonding process, the cover plate 90 is pressed down so that a part of the water adhesive 100 overflows onto the tape 80 through the through hole 1202 of the tape holder 120; and then the water adhesive 100 is cured.

For example, referring to FIGS. 11 and 12, the method may further include a step of forming the touch substrate. Step S1265 is added after step S126. In step S1265, the cover plate 90 and the touch substrate 300 are bonded. For example, in this step, the encapsulation adhesive 110' is coated so that the encapsulation adhesive 110' is annularly arranged around the touch substrate 300; the water adhesive 100' is coated to cover the surface of the touch substrate 300 surrounded by the encapsulation adhesive 110'; the cover plate 90 is bonded, and in the bonding process, the cover plate 90 is pressed down so that the cover plate 90 and the touch substrate 300 are bonded together; and then the water adhesive 100' is cured, so as to form the touch panel.

Correspondingly, in step S127, the touch panel formed in step S1265 may be bonded to the structure obtained in step S126. For example, in this step, the encapsulation adhesive 110 is coated, so that the encapsulation adhesive 110 is annularly arranged on the periphery of the upper polarizer 405 of the display panel 40; the water adhesive 100 is coated to cover the upper polarizer 405; the touch panel is bonded, and during the bonding process, the touch panel is pressed down so that a part of the water adhesive 100 overflows onto the tape 80 through the through hole 1202 of the tape holder 120; and then, the water adhesive 100 is cured.

Although some embodiments according to the general concept of the present disclosure are shown and described, those skilled in the art should understand that, these embodiments may be changed without departing from the principle and the spirit of the present disclosure, and the scope of the present disclosure is defined by the following claims and their equivalents.

What is claimed is:

1. A display device, comprising:
   a display module, comprising a first outer surface, a second outer surface and a side surface, wherein the first outer surface and the second outer surface are arranged opposite to each other, the side surface connects the first outer surface and the second outer surface, and the first outer surface is located on a light-emitting side of the display module;
   a tape, comprising a first part and a second part, wherein the first part is bonded to an edge of the first outer surface of the display module, and the second part is bonded to the side surface of the display module;
   a cover component, wherein the cover component and the display module are arranged oppositely and spaced apart; and
   a tape holder between the cover component and the display module, comprising a main body portion and at least one through hole,
   wherein at least a part of the main body portion is pressed on an end portion of the first part of the tape, and divides a space between the cover component and the display module into a first space and a second space, and the at least one through hole is formed in the main body portion and communicates the first space with the second space; and
   wherein the display device further comprises: a first optical adhesive portion and a second optical adhesive portion,
   wherein the first space is closer to the side surface of the display module than the second space, the first optical adhesive portion is located in the first space to press on at least a part of the first part of the tape, and the second optical adhesive portion completely fills the second space.

2. The display device according to claim 1, wherein the main body portion comprises two or more through holes, and each through hole communicates the first space with the second space.

3. The display device according to claim 1, wherein a thickness of the main body portion is smaller than or equal to a distance between the display module and the cover component.

4. The display device according to claim 1, wherein the display module comprises a polarizer, the polarizer is arranged close to the first outer surface, and the end portion of the first part of the tape abuts the polarizer.

5. The display device according to claim 4, wherein a side surface of the first part of the tape facing the polarizer is closer to the side surface of the display module than a side surface of the main body portion facing the second space.

6. The display device according to claim 5, wherein a part of the main body portion is further pressed on the polarizer.

7. The display device according to claim 4, wherein a side surface of the main body portion facing the second space is flush with a side surface of the first part of the tape facing the polarizer.

8. The display device according to claim 4, wherein a surface of the first part of the tape facing the cover component is substantially flush with a surface of the polarizer facing the cover component.

9. The display device according to claim 1, wherein the tape holder is annularly arranged between the cover component and the display module.

10. The display device according to claim 1, wherein the main body portion and the tape both comprise a light shielding material.

11. The display device according to claim 1, wherein the main body portion comprises a black rubber material.

12. The display device according to claim 1, wherein the first optical adhesive portion and the second optical adhesive portion comprise a water adhesive.

13. The display device according to claim 1, wherein the tape further comprises a third part that is bonded to an edge of the second outer surface of the display module.

14. The display device according to claim 1, further comprising an encapsulation adhesive,
wherein the encapsulation adhesive is annularly arranged between the cover component and the display module, and the encapsulation adhesive is closer to the side surface of the display module than the tape holder.

15. The display device according to claim 1,
wherein the display module comprises a backlight module, a display panel, a back frame and a middle frame, and the backlight module is located in an accommodation space of the back frame, the display panel is carried on the middle frame; and
wherein the second outer surface is on a side of the back frame away from the backlight module, the first outer surface is on a side of the middle frame and the display panel away from the backlight module, and the side surface is on a side of the middle frame away from the backlight module.

16. The display device according to claim 1, wherein the cover component comprises a transparent cover plate.

17. The display device according to claim 1, wherein the cover component comprises a transparent cover plate and a touch substrate, and the touch substrate is bonded to a surface of the transparent cover plate facing the display module.

18. The display device according to claim 1, wherein the tape further comprises a third part that is bonded to an edge of the second outer surface of the display module.

19. A method for manufacturing a display device, comprising:
forming a display module by assembling, wherein the display module comprises a first outer surface, a second outer surface and a side surface, the first outer surface and the second outer surface are arranged opposite to each other, the side surface connects the first outer surface and the second outer surface, and the first outer surface is located on a light-emitting side of the display module;
bonding a tape at least on an edge of the first outer surface of the display module and the side surface of the display module;
pressing a tape holder at least on an end portion of a tape bonded to the edge of the first outer surface of the display module, wherein the tape holder comprises a main body portion and at least one through hole formed in the main body portion; and
bonding a cover component, wherein the main body portion is arranged between the cover component and the display module, a space between the cover component and the display module is divided into a first space and a second space, and the at least one through hole communicates the first space with the second space,
wherein the display device further comprises: a first optical adhesive portion and a second optical adhesive portion, wherein the first space is closer to the side surface of the display module than the second space, the first optical adhesive portion is located in the first space to press on at least a part of the first part of the tape, and the second optical adhesive portion completely fills the second space.

* * * * *